US005542569A

United States Patent [19]

Millar

[11] Patent Number: 5,542,569

[45] Date of Patent: Aug. 6, 1996

[54] CONDIMENT VENDING MACHINE

[75] Inventor: Marty R. Millar, Frisco, Tex.

[73] Assignee: Simplyfry Inc., Dallas, Tex.

[21] Appl. No.: 277,831

[22] Filed: Jul. 20, 1994

[51] Int. Cl.$^6$ .................. B65G 59/00

[52] U.S. Cl. .................. 221/116; 221/197; 221/268

[58] Field of Search .................. 221/112, 114, 221/115, 116, 117, 126, 131, 197, 241, 242, 258, 268, 270, 272

[56] References Cited

U.S. PATENT DOCUMENTS

| | | | |
|---|---|---|---|
| 412,469 | 10/1889 | Cochran | 221/116 |
| 1,146,921 | 7/1915 | Chapman | 221/131 |
| 2,197,634 | 4/1940 | Grenier | 221/114 |
| 3,136,450 | 6/1964 | Carpenter | 221/114 |
| 3,163,327 | 12/1964 | Maxwell | 221/197 |
| 3,351,233 | 11/1967 | Chanoch et al. | 221/131 |
| 3,653,541 | 4/1972 | Crum | 221/268 |
| 4,299,333 | 11/1981 | Welsch | 221/197 |

FOREIGN PATENT DOCUMENTS

| | | | |
|---|---|---|---|
| 0009496 | 1/1991 | Japan | 221/117 |
| 404162194 | 6/1992 | Japan | 221/242 |

*Primary Examiner*—H. Grant Skaggs
*Attorney, Agent, or Firm*—H. Dennis Kelly; Timmons & Kelly

[57] ABSTRACT

A stack of condiment packages is loaded into a tube, and the tube is inserted into a receiver. The first package rests on a support platform, and the receiver holds the tube at a position to secure all of the packages above the first. A push block on the end of a piston rod pushes the first package out from under the tube, and then retracts to allow the stack to fall to the support platform.

15 Claims, 6 Drawing Sheets

CONDIMENT VENDING MACHINE

BACKGROUND OF THE INVENTION

1. Field of the Invention

This invention relates in general to vending machines. In particular, the invention relates to machines for vending condiments and other articles sold in small packages.

2. Description of Related Art

Machines have been designed for vending almost any type of article that can be stored in a box. Cigarettes and soft drinks have been sold by machines for many years.

In recent years, condiments, such as ketchup, mustard, and various sauces, have been packaged in small packages containing a single serving. Such packages limit waste of condiments, and allow the condiment to be sold per serving. Without these packages, condiments often must be provided free in large bottles or jars.

If the small packages of condiments can be sold by machine, the packages can be sold by the serving. When the condiments are sold by the serving, must less waste occurs.

When small packages are sold by vending machine, the packages are often stored in individual storage compartments within the machine. It can take many hours to refill the storage compartments in a vending machine.

SUMMARY OF THE INVENT I ON

The general object of the invention is to sell or dispense packages of condiments. In general, this object is accomplished by a vending machine having a tube for holding a vertical stack of condiment packages. The first condiment package, on the bottom of the stack, rests upon the a support platform. A receiver holds the tube at a position so that the bottom of the tube is above the first package, and below the top of the second package.

A cylinder and piston assembly pushes a push block under the tube, to push the first condiment package out from under the stack. The assembly then pulls the push block out from under the tube, to allow the second condiment package to fall to the support platform.

The above, as well as additional objects, features, and advantages of the invention will become apparent in the following detailed description.

DESCRIPTION OF THE PREFERRED EMBODIMENT

Figure 1:
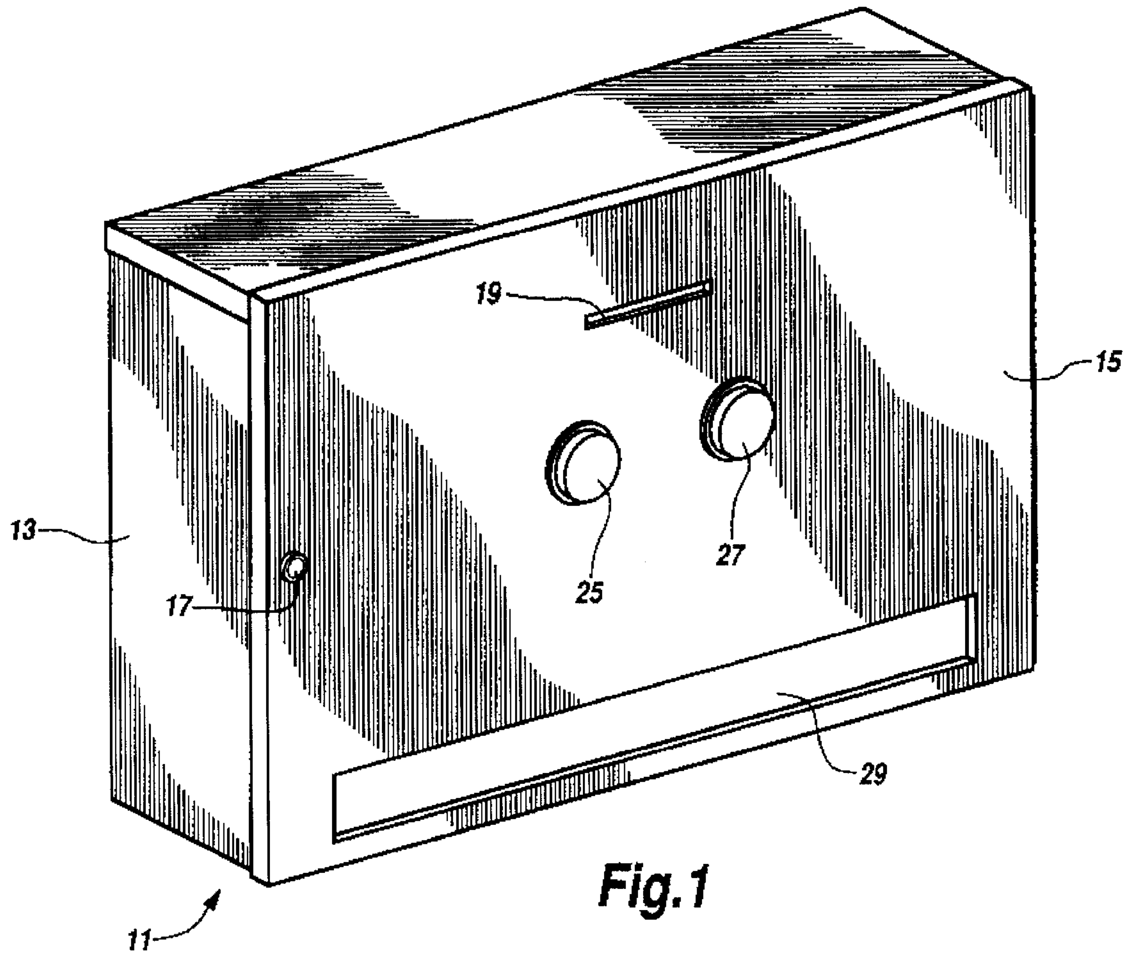
FIG. 1 is a perspective view of a condiment vending machine according to the invention, with the door closed.
Figure 2:
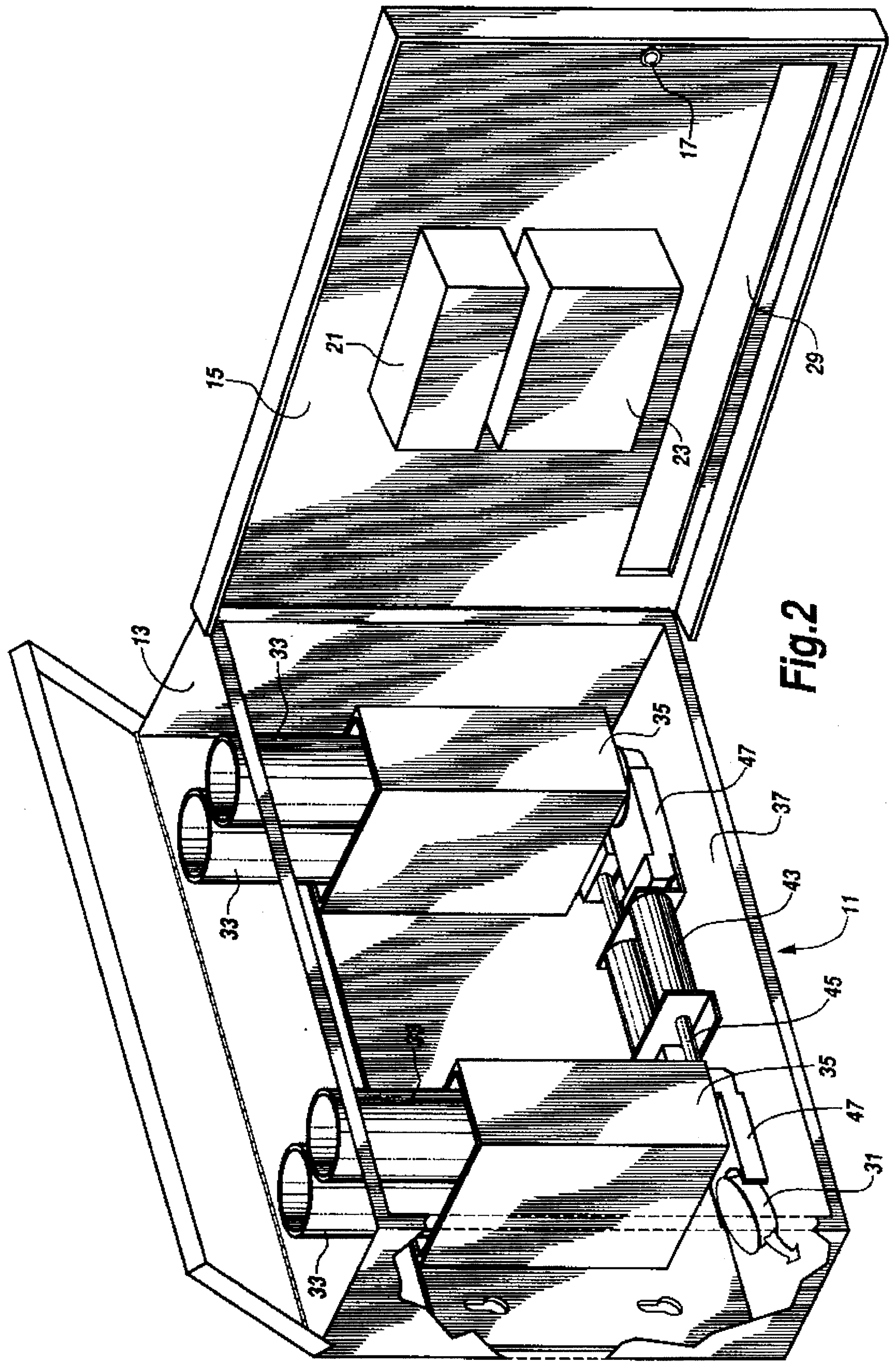
FIG. 2 is a perspective view of a condiment vending machine according to the invention, with the door open.
Figure 3:
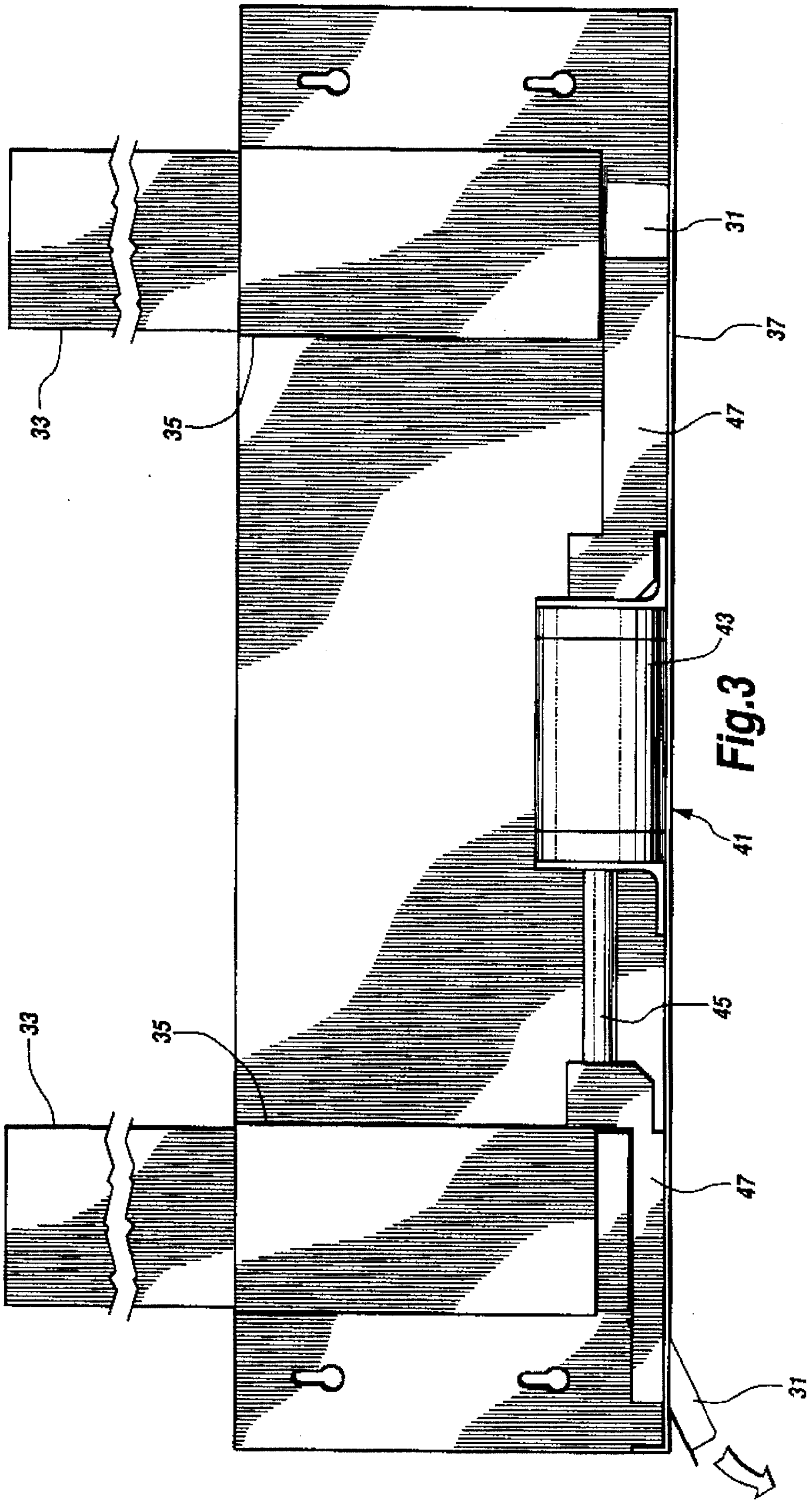
FIG. 3 is a front elevation of the operational mechanism of the vending machine of the invention.
Figure 4:
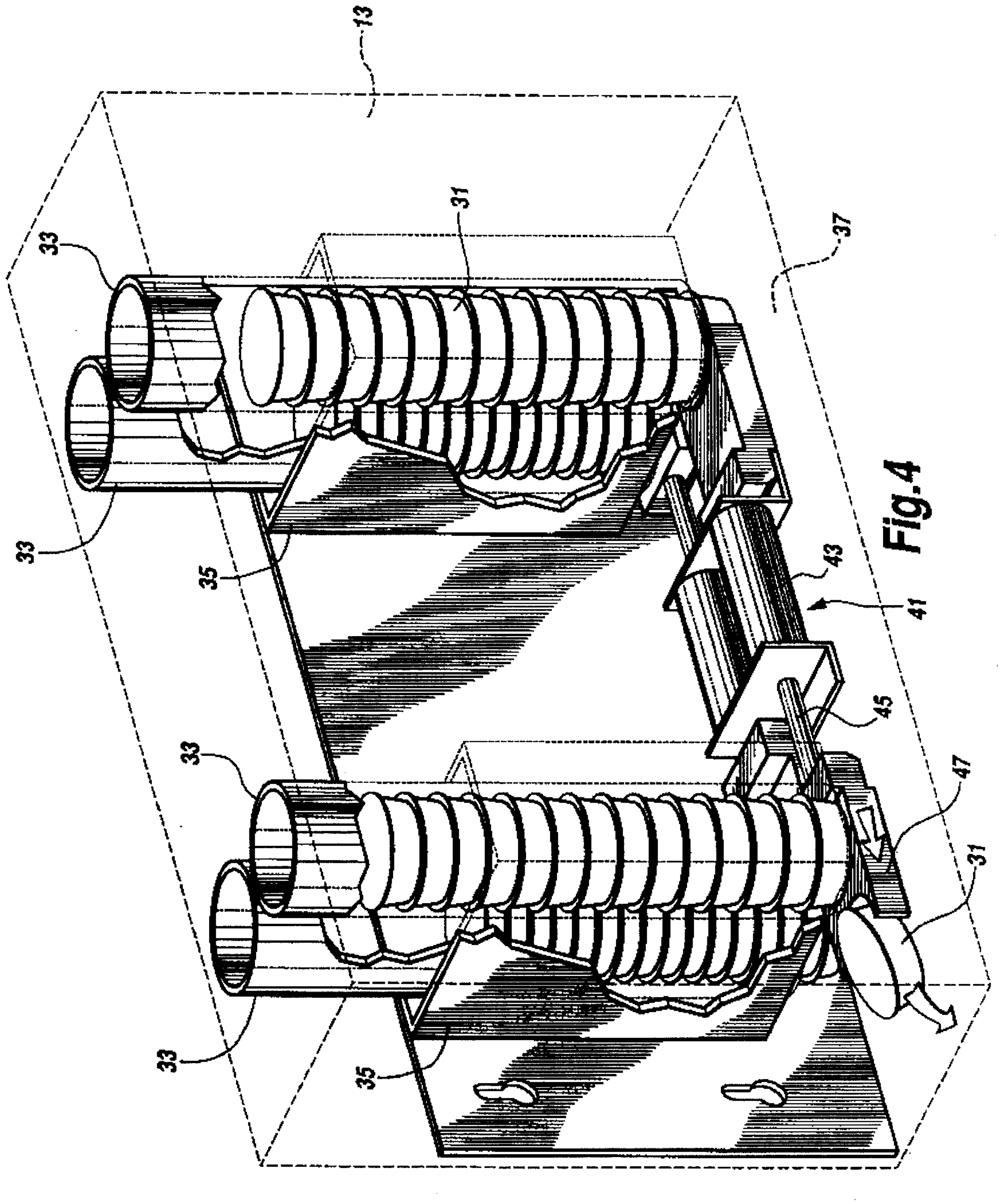
FIG. 4 is a perspective view, partially in section, of the operational mechanism of the invention.
Figure 5:
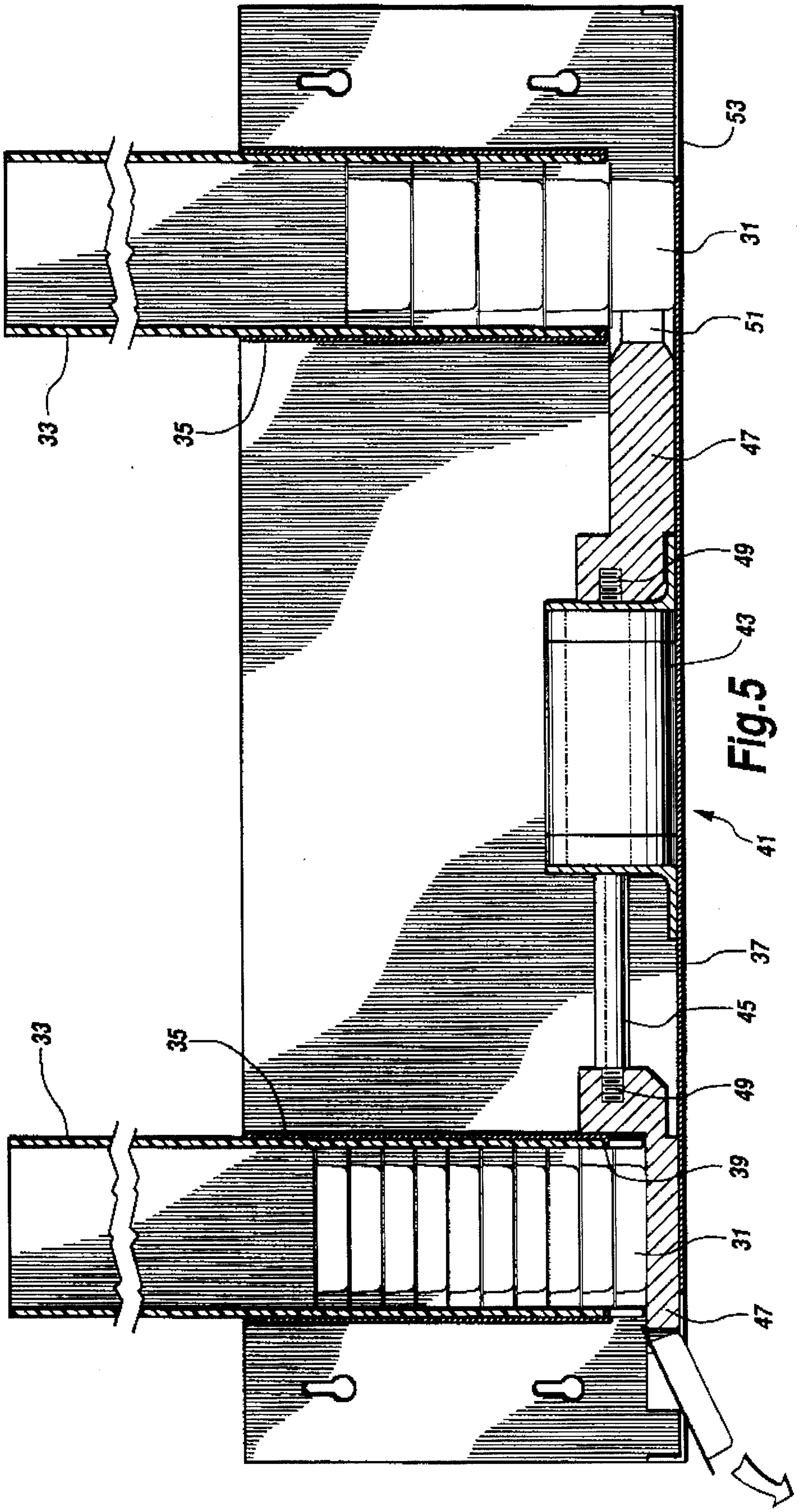
FIG. 5 is a front sectional view of the operational mechanism, as seen along lines 5—5 in FIG. 6.
Figure 6:
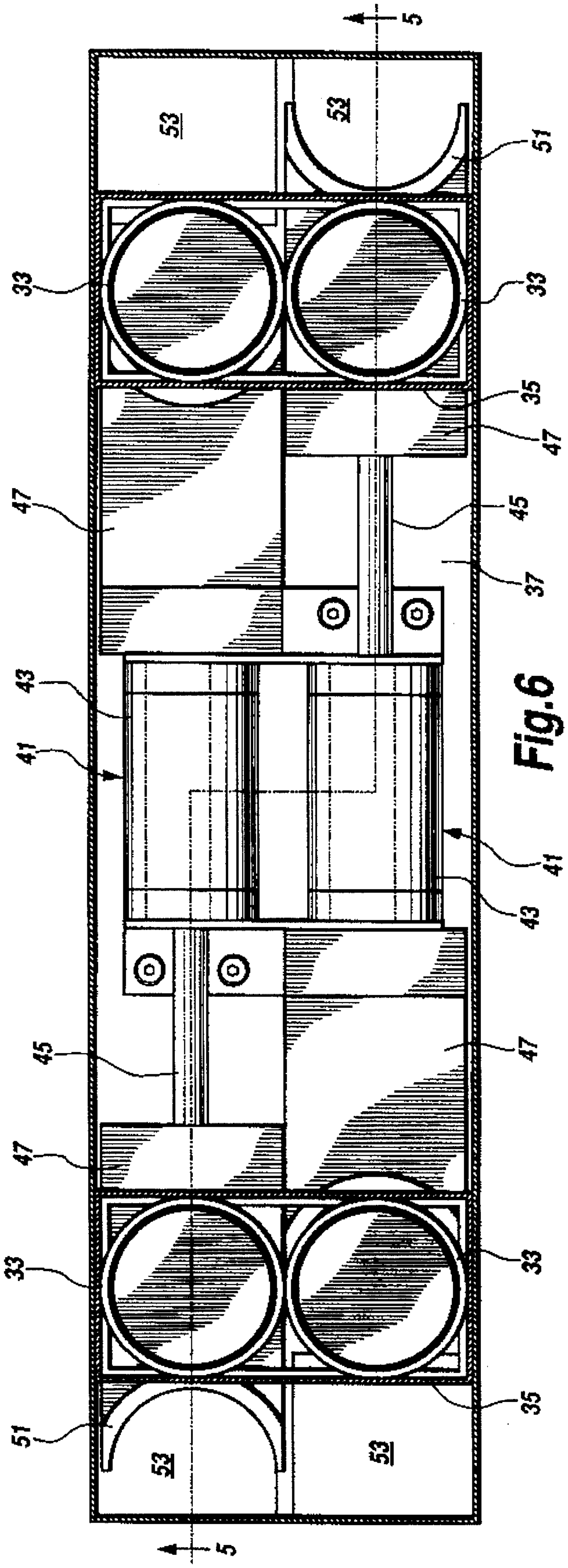
FIG. 6 is a top plan view of the operational mechanism.

As shown in FIGS. 1 and 2, the vending machine 11 of the invention is housed in a cabinet 13. The cabinet 13 has a door 15 mounted on hinges to allow the door 15 to be opened, as shown in FIG. 2. A lock 17 on the door 15 secures the door 15.

The cabinet 13 has a coin slot 19 for the insertion of coins into the vending machine 11. Coins inserted into the slot 19 fall through a coin operated mechanism 21 and into a coin box 23.

After an adequate amount of coins have passes through the coin operated mechanism, selector knobs 25 and 27 on the door 15 of the cabinet 13 allow a customer to select between two different condiments. One or more openings 29 in the door 15 provide an area for the condiment packages to be delivered to a customer.

The internal workings of the vending machine 11 are illustrated in FIGS. 3—6. Stacks of condiment packages 31 are held within four tubes 33. The tubes 33 may be various sizes, to hold condiment packages 31 of different sizes, but generally each tube 33 will hold about fifty packages 31.

Each tube 33 is placed within one of four receivers 35. The inside diameters of the receivers 35 are slightly larger than the outside diameters of the tubes 33. Thus, the tubes 33 can be easily inserted and withdrawn from the receivers 35 for refill.

When a tube 33 is placed within a receiver 35, the first condiment package 31 rests upon a horizontal support platform 37. The support platform 37 is located above the opening 29 in the door 15 of the vending machine 11.

Condiment packages 31 are generally manufactured in two standard sizes, one size being about twice as tall as the other. Both sizes of packages 31 have about the same diameter.

Each receiver 35 has one or more inward projections 39. When the bottom of a tube 33 rests upon a projection 39, the tube 33 is positioned at a higher position. This higher position is used for condiment packages 31 of the larger size. In this position, the bottom of the tube 33 is above the top of the first of the larger condiment packages 31, and below the top of the second package 31.

Each tube 33 has one or more slots, for cooperation with the projections 39 on the receivers 35. When the smaller packages 31 are used, the tube 33 is turned until the slots align with the projections 39. The tube 33 then will rest in a lower position. The lower position is used for smaller condiment packages 31. In this position, the bottom of the tube 33 is above the top of the first of the smaller condiment packages 31, and below the top of the second package 31.

In the preferred embodiment, the vending machine 11 contains four receivers 35 for holding four tubes 33 of condiment packages 31. The two receivers 35 in the front of the machine 11 hold one type of condiment package 31, and the two receivers 35 in the rear of the machine 11 hold a second type of condiment package 31. In the embodiment shown in the drawings, the front tubes 33 are holding smaller packages 31 and the rear tubes 33 are holding larger packages 31.

A pair of cylinder and piston assemblies 41 are mounted between each pair of receivers 35. Each assembly 41 has a dual action cylinder 43 and two opposing piston rods 45. The cylinders 43 may be hydraulic, but are preferably pneumatic. When one piston rod 45 is extended, the opposing piston rod 45 is retracted.

A push block 47 is attached to the end of each piston rod 45 with a pin 49. The push blocks 47 are made in two sizes, depending on the size of condiment package 31 being sold. In the embodiment shown, smaller push blocks 47 are used on the front piston rods 45 and larger push blocks 47 are used on the rear piston rods 45. Each push block 47 has a concave forward edge 51 for contacting the condiment packages 31. The push blocks 47 can be easily changed if the size of the condiment packages 31 is changed.

When one of the piston rods 45 is extended, the push block 47 on the end of that rod 45 slides along the support platform 37 and passes under the bottom of the corresponding tube 33. The push block 47 pushes the first condiment package 31 out from under the second package 31, as the second package 31 is held in place by the tube 33. When the piston rod 45 is fully extended, the push block 47 pushes the first package 31 into an opening 53 in the support platform 37. The first package 31 falls through the opening 53 and down to the opening 29 in the door 15.

As one piston rod 45 is extended, the opposing piston rod 45 on the same cylinder and piston assembly 41 is retracted. When the piston rod 45 is retracted, the push block 47 on that rod 45 is pulled out from under the tube 33. As the push block 47 clears the tube 33, the second condiment package 31 falls to the support platform 37.

The apparatus of the invention has several advantages over the prior art. The condiment packages 31 can be loaded in to the tubes 33 at an office and then delivered to the vending machine 11. This saves the time required to load packages 31 into a prior art vending machine. The tube 33 hold the packages 31 in neat, efficient vertical stacks, which seldom jam or misfeed.

The invention has been described in only one embodiment. It should be apparent to those skilled in the art that the invention is not so limited, but is susceptible to various changes and modifications without departing from the spirit of the invention.

I claim:

1. A condiment vending machine, comprising:

a support platform;

a pair of tubes, each having a lower end for holding a vertical stack of condiment packages wherein the first condiment package in each tube rests upon the support platform;

a pair of receivers, each receiver holding one of the tubes above the support platform in a position wherein the lower end of that tube is located above the top of first condiment package in that tube and below the top of the second condiment package in that tube;

a pair of push blocks for pushing the first condiment package in each tube out from under the stacks of condiment packages; and a cylinder and piston rod assembly for pushing the push blocks under the tubes, and for pulling the push blocks out from below the tubes to allow the stack of condiment packages to fall to a position wherein the second package rests upon the support platform.

2. A condiment vending machine, as recited in claim 1, wherein the stacks and the cylinder and piston assembly are linearly aligned, so that when one of the push blocks is being pushed under one of the stacks, the other push block is being pulled out from under the other stack.

3. A condiment vending machine, as recited in claim 1 wherein each receiver further comprises:

a lower end; and a inward projection for cooperation with a slot on the lower end of the tube to allow the tube to be positioned at either a higher position, in which the lower end of the tube rests upon the projection, and a lower position, in which the projection extends into the slot in the tube.

4. A condiment vending machine, as recited in claim 1, wherein the push blocks have concave surfaces for contact with the condiment packages.

5. A condiment vending machine, as recited in claim 1, further comprising a coin operated mechanism for causing the cylinder and piston assembly to operate in response to the insertion of an adequate amount of coins into the mechanism.

6. A condiment vending machine, as recited in claim 1, wherein the support platform has an opening and the push block pushes the first condiment package into the opening.

7. A condiment vending machine, as recited in claim 1 wherein the push blocks are replaceable with push blocks of a different size.

8. A condiment vending machine, comprising:

a support platform;

four tubes, each having a lower end, for holding a vertical stack of condiment packages, wherein the first condiment package in each tube rests upon the support platform;

four receivers, each receiver holding one of the tubes above the support platform in a position wherein the lower end of that tube is located above the top of first condiment package in that tube and below the top of the second condiment package in that tube;

four push blocks for pushing the first condiment package in each tube out from under the stacks of condiment packages; and a pair of cylinder and piston rod assemblies for pushing the push blocks under the tubes, and for pulling the push blocks out from below the tubes to allow the stack of condiment packages to fall to a position wherein the second package rests upon the support platform.

9. A condiment vending machine, as recited in claim 8, wherein two stacks are linearly aligned with each cylinder and piston assembly, so that when one of the push blocks is being pushed under one of the stacks, the other push block is being pulled out from under the other stack.

10. A condiment vending machine, as recited in claim 8, wherein each receiver further comprises:

a lower end; and a inward projection for cooperation with a slot on the lower end of the tube to allow the tube to be positioned at either a higher position, in which the lower end of the tube rests upon the projection, and a lower position, in which the projection extends into the slot in the tube.

11. A condiment vending machine, as recited in claim 8, wherein the push blocks have concave surfaces for contact with the condiment packages.

12. A condiment vending machine, as recited in claim 8, further comprising:

a coin operated mechanism for causing one of the cylinder and piston assemblies to operate in response to the insertion of an adequate amount of coins into the mechanism; and selection means for selecting which cylinder and piston assembly operates in response to the mechanism.

13. A condiment vending machine, as recited in claim 8, wherein the support platform has an opening and the push blocks push the first condiment package into the opening.

14. A condiment vending machine, as recited in claim 8, wherein the push blocks are replaceable with push blocks of a different size.

15. A condiment vending machine, comprising:

a support platform;

a tube, having a lower end, for holding a vertical stack of condiment packages, wherein the first condiment package rests upon the support platform;

a receiver for holding the tube above the support platform in a position wherein the lower end of the tube is located above the top of the first condiment package and below the top of the second condiment package, and wherein the receiver has a lower end and an inward projection for cooperation with a slot on the lower end of the tube to allow the tube to be positioned at either a higher position, in which the lower end of the tube rests upon the projection, and a lower position, in which the projection extends into the slot in the tube;

a push block for pushing the first condiment package out from under the stack of condiment packages; and means for pushing the push block under the tube, and for pulling the push block out from below the tube to allow the stack of condiment packages to fall to a position wherein the second package rests upon the support platform.

* * * * *